United States Patent [19]

Petkovic

[11] Patent Number: 5,160,638
[45] Date of Patent: Nov. 3, 1992

[54] OIL SPILL CLEANING SCREW

[76] Inventor: Tony Petkovic, 107 - 1502 Island Park Walk, Vancouver, British Columbia, Canada, V6H 3Z8

[21] Appl. No.: 640,229

[22] Filed: Jan. 11, 1991

Related U.S. Application Data

[63] Continuation-in-part of Ser. No. 460,382, Jan. 3, 1990, abandoned.

[51] Int. Cl.⁵ .............................................. E02B 15/04
[52] U.S. Cl. .................................. 210/776; 210/799; 210/923
[58] Field of Search .................. 210/242.1, 242.3, 776, 210/923, 415, 398, 399, 799; 198/676

[56] References Cited

U.S. PATENT DOCUMENTS

| | | | |
|---|---|---|---|
| 1,686,095 | 10/1928 | Manning | 210/415 |
| 2,517,833 | 8/1950 | Bourland | 198/676 |
| 3,618,768 | 11/1971 | Brown | 210/923 |
| 3,700,108 | 10/1972 | Richards | 210/242.3 |
| 3,947,360 | 3/1976 | Fast | 210/923 |
| 4,151,081 | 4/1979 | Bolli et al. | 210/242.3 |
| 4,196,087 | 4/1980 | Gordon | 21/242.3 |
| 4,322,294 | 3/1982 | Price | 210/242.3 |
| 4,456,536 | 6/1984 | Lorenz et al. | 210/242.3 |
| 4,808,303 | 2/1989 | Arnold | 210/242.1 |
| 5,051,181 | 9/1991 | Sandkvist | 210/923 |

FOREIGN PATENT DOCUMENTS

| | | |
|---|---|---|
| 2259281 | 6/1973 | Fed. Rep. of Germany . |
| 3036505 | 5/1982 | Fed. Rep. of Germany . |
| 1314495 | 11/1961 | France . |

Primary Examiner—Stanley S. Silverman
Assistant Examiner—Christopher Upton
Attorney, Agent, or Firm—Barrigar & Oyen

[57] ABSTRACT

A device for cleaning an oil spill from a water surface comprises an inclined rotatably mounted helical screw having a lower water-engaging end and an upper outlet end, a screw casing encasing said screw for rotatably supporting the screw, the screw casing closely encasing the screw so as to form a rotating fluid seal between the casing and the rotatably mounted screw, the screw casing having a lower opening for partial submersion in the water and an upper outlet for the evacuation of the oil from the screw into a storage reservoir. The helical vane of the screw has oil separating perforations therein for retaining the oil on the upper surface of the vane while allowing the water to flow therethrough.

1 Claim, 1 Drawing Sheet

OIL SPILL CLEANING SCREW

CROSS-REFERENCE TO RELATED APPLICATIONS

This application is a continuation-in-part of United States patent application Ser. No. 07/460,382 filed Jan. 3, 1990, now abandoned.

FIELD OF THE INVENTION

This invention relates to devices used to collect oil spills from the surface of a body of water.

BACKGROUND OF THE INVENTION

The occurrence of oil spills has steadily increased with the increased use and transport of oil. Over the past twenty years, a great deal of work has been carried out on devices and methods to deal with oil spills and clean-ups. Many different mechanical devices for collecting oil from the surface of the water, called generally skimming devices, have been devised, such as adhesive surface devices, porous surface devices, continuous belt devices, centrifugal devices and many more. No one device is useful for the mechanical recovery of every type of oil spill, however. The principal factors which determine the nature of the skimming device required are the size and the location of the spill. Large spills in open sea require different equipment than spills on sheltered waters. No single set of equipment is recommended in the presently available literature as the best for both sheltered water spills and spills at sea.

U.S. Pat. No. 3,618,768, issued to Brown on Nov. 9, 1971 teaches the use of a floating helical or screw-type conveyor attached at one end to a first vessel by a universal pivot, such as a ball joint, and at its other end to a second vessel having a motor for rotating the conveyor, and a collection tank for containing fluids and debris which are collected by the conveyor. The conveyor is used as a helical pump to pump fluid and debris collected by the conveyor by encasing the conveyor in a tube at one end. The collected fluids and debris are thus delivered into the reservoir on the second boat. In another embodiment, the conveyor is enclosed in a flexible tubing having a longitudinal opening on one side for admitting the oil from the surface of the water. The helical conveyor in Brown, however, is not used itself to separate oil from water, but merely to transport whatever material comes into contact with it. Separation is accomplished by slots in the casing of the conveyor, or by skilful movement and location of the equipment.

Various other devices are taught in the prior art which incorporate rotating spiral screws for the removal of impurities from water. French patent no. 1,314,495 issued to Bechard on Nov. 29, 1961 teaches a spiral screw having its lower ends supported by a central float for transporting floating materials such as oil, fats, and foams to a receiver where they are extracted. As in the Brown apparatus, the spiral screw is merely used as a conveyor and not as a separator mechanism. Similarly, U.S. Pat. No. 4,151,081 issued to Bolli et al. on Apr. 24, 1979 teaches the use of a spiral screw in conjunction with a partitioned housing to skim oil from the surface of water. U.S. Pat. No. 4,196,087 issued to Gordon on Apr. 1, 1980 teaches the use of spiral screw assemblies for conveying floating liquids to a central filtering mechanism. Again, the screws act merely as conveyors and do not themselves act to separate oil from water.

SUMMARY OF THE INVENTION

A device for collecting oil from a surface of water is provided. The device comprises (a) an inclined, hollow, cylindrical screw casing having an inner surface, a lower opening for partial submersion below the water surface, and an upper opening for evacuation of the oil, (b) a helical screw mounted for rotation in the screw casing about a central axis and comprising a screw vane having an outer edge, and (c) means for rotating said screw about said axis, wherein the screw casing closely encases the screw so as to form a rotating fluid seal between the inner surface of the casing and the rotatably mounted screw, and wherein the vane of the screw comprises oil-separating perforations for retaining the oil on the upper surface of the vane while allowing the water to flow therethrough. Advantageously, the perforations have diameters between 5/64" and ⅛", and the blade has 5 or 6 perforations per square inch of blade surface. Preferably, the screw casing is inclined so as to form an angle between the central axis and the horizontal between 35 and 50 degrees.

BRIEF DESCRIPTION OF THE DRAWINGS

In the drawings, which illustrate a preferred embodiment of the invention.

DESCRIPTION OF THE PREFERRED EMBODIMENT

Figure 1:
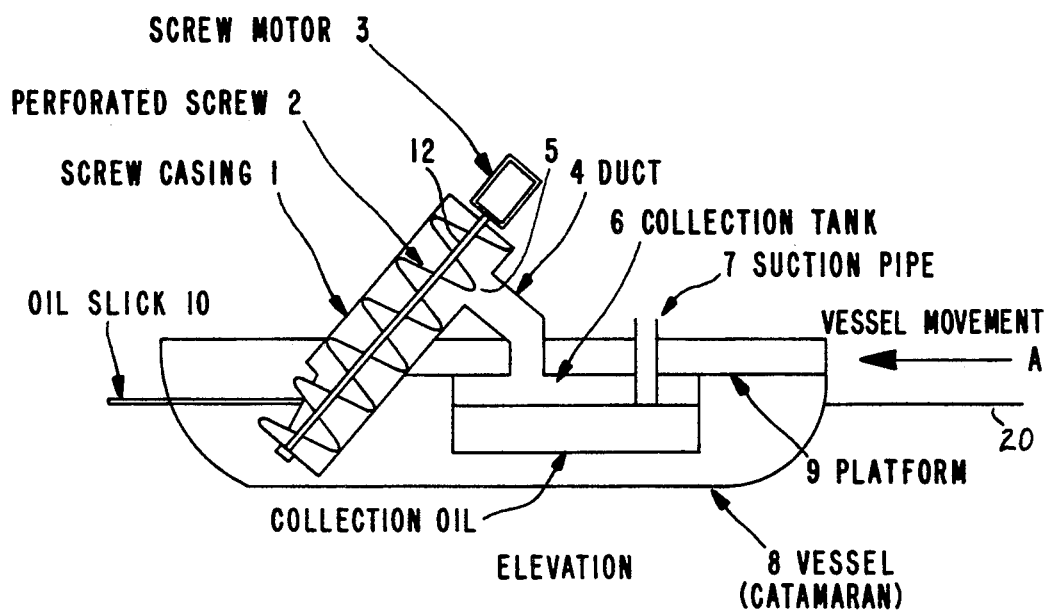
FIG. 1 is a cut-away side elevation view showing the present invention mounted between the hulls of a catamaran.

Referring to FIG. 1, there is shown screw casing 1, mounted between the catamaran hulls of vessel 8. Screw casing 1 is mounted so that the lower casing opening faces forward and is partially submerged, that is, so that the opening lies partially below the waterline 20. Screw casing 1 forms an acute angle with respect to the horizontal, preferably between 35 and 50 degrees.

Screw casing contains a rotatably mounted helical screw 2, having a central axis 12 and helical vanes 14, and connected at the upper end of its central axis 12 to a driving motor 3. Screw 2 is mounted in bearings at either end of axis 12. Between the two catamaran hulls of vessel 8 extends a platform 9. Platform 9 rigidly connects the catamaran hulls and supports a collection tank 6. Four or more screw casings 1 may be supported side-by-side from platform 9. The edges of the vanes 14 of helical screw 2 form a relatively tight fluid seal with the inner surface of the casing 1 except in the vicinity of opening 5 in the upper end of casing 1. Duct 4 connects opening 5 to collection tank 6. Collection tank 6 may be drained by suction pipe 7.

Figure 2:
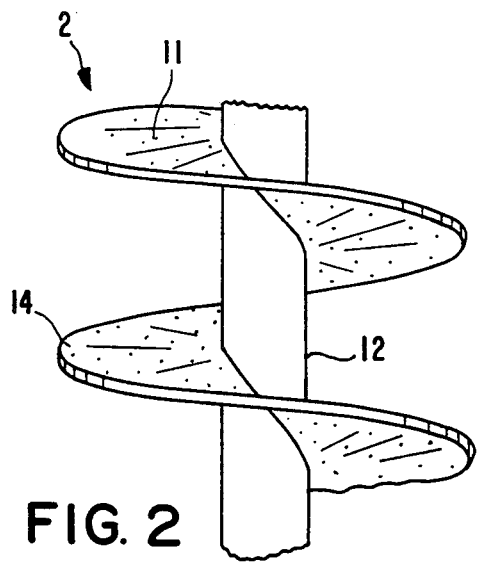
FIG. 2 is a partial perspective view of a section of the helical screw of the invention.

As illustrated in FIG. 2, the vanes 14 of screw 2 are perforated with perforations 11. A pattern of perforations in which there are 5 or 6 holes per square inch of blade surface, each hole having a diameter of between 5/64" and ⅛", has been found to be effective to allow water to flow through the perforations 11 while retaining oil on the surface of the screw vane. Rotating screw 2 acts to raise oil from slick 10 until the oil reaches the upper opening 5 in screw casing 1 whereupon it flows from casing 1 under the force of gravity, to be collected, via duct 4, in collection tank 6.

The screw perforations are of a specific size to take advantage of both the viscosity of oil and the inherent surface tension of the oil. Under commonly prevailing ocean conditions, oil coagulates to the extent that oil will not flow freely through perforations 11 whereas water under the same conditions will flow freely through perforations 11. Perforations 11 thus act to filter oil 10 from the sea water picked up by screw 2.

Proper selection of the angle which screw 2 forms with the horizontal also will assist the separation of oil and water on the surface of screw vanes 14. It has been found that, if the edges of screw vanes 14 form at least a partial fluid seal with casing perforated screw 2, rotating within screw casing 1, will raise a volume of water on the blade surface if the angle between central axis 12 and the horizontal does not exceed 35 degrees. Oil however, due to greater surface tension and viscosity, will be raised by screw 2 until the angle of axis 12 reaches about 50 degrees with the horizontal. If the casing is raised therefore to an angle between about 35 degrees and 50 degrees from the horizontal, then screw 2 will raise a mixture of oil and water which is primarily oil.

In operation, vessel 8 travels in forward direction A with rotating screw 2 engaging oil slick 10 within the lower opening of screw casing 1. With screw 2 rotating in screw casing 1, the oil and water mixture enters the lower opening in screw and is carried upwardly by the perforated vanes 14 in casing 1. Water which is carried up the vanes 14 will for the most part flow under the force of gravity through perforations 11 on screw 2, while oil will be carried up vanes 14 to opening 5. Oil flows down ducts 4 and is recovered from collection tank 6 through suction pipe 7, to be pumped to storage barges or floating rubber tanks (not shown) which are towed to shore when full.

What is claimed is:

1. A method of collecting oil from a surface of water, comprising:
   (a) providing a buoyant vessel, having forward and rearward ends, for supporting on said surface of water a screw casing, a helical screw mounted for rotation in said screw casing about a central axis and means for rotating said screw in said casing, whereby said screw casing is supported at an oblique angle to said surface of water; said screw casing being hollow, cylindrical and having an inner surface, a forwardly-facing lower opening and an upper opening for evacuation of said oil, whereby said lower opening of said screw casing is partially submerged below said surface of water, said screw comprising a screw vane having an outer edge;
   wherein said screw casing closely encases said screw so as to form a rotating fluid seal between said inner surface of said casing and said rotatably mounted screw, and wherein said vane of said screw comprises oil-separating perforations for retaining said oil on the upper surface of said vane while allowing said water to flow therethrough;
   (b) moving said vessel forwardly on the surface of said water in a direction in the same plane as the axis of rotation of the screw;
   (c) rotating said screw in said casing to raise and separate said oil from said water; and
   (d) collecting said oil from said upper opening in a storage reservoir.

* * * * *